United States Patent
Nakagawa et al.

(10) Patent No.: US 9,914,412 B2
(45) Date of Patent: Mar. 13, 2018

(54) BAND CLIP

(71) Applicant: Sumitomo Wiring Systems, Ltd., Yokkaichi, Mie (JP)

(72) Inventors: Kazuki Nakagawa, Mie (JP); Daiki Nagayasu, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days.

(21) Appl. No.: 15/503,199

(22) PCT Filed: Sep. 25, 2015

(86) PCT No.: PCT/JP2015/077151
§ 371 (c)(1),
(2) Date: Feb. 10, 2017

(87) PCT Pub. No.: WO2016/052349
PCT Pub. Date: Apr. 7, 2016

(65) Prior Publication Data
US 2017/0225631 A1 Aug. 10, 2017

(30) Foreign Application Priority Data
Oct. 3, 2014 (JP) .................................. 2014-204652

(51) Int. Cl.
*F16L 3/00* (2006.01)
*B60R 16/02* (2006.01)
(Continued)

(52) U.S. Cl.
CPC ............ *B60R 16/0215* (2013.01); *F16B 2/08* (2013.01); *F16B 19/00* (2013.01); *F16L 3/137* (2013.01); *H02G 3/22* (2013.01)

(58) Field of Classification Search
CPC ... F16L 3/137; F16L 3/233; F16L 3/08; F16L 3/24
(Continued)

(56) References Cited

U.S. PATENT DOCUMENTS 4,875,647 A * 10/1989 Takagi .................... F16L 3/233
24/16 PB
5,131,613 A * 7/1992 Kamiya .................. F16L 3/233
24/16 PB
(Continued)

FOREIGN PATENT DOCUMENTS

JP          H08145021 A      6/1996
JP          2002174210 A     6/2002
(Continued)

OTHER PUBLICATIONS

International Search Report and Written Opinion for Application No. PCT/JP2015/077151 dated Dec. 22, 2015, 7 pages.
(Continued)

*Primary Examiner* — Steven M Marsh
(74) *Attorney, Agent, or Firm* — Reising Ethington, P.C.

(57) ABSTRACT

A Band clip that, when an electrical wire has been attached to a target by the clip, makes it possible to position a shaft portion of the clip toward the widthwise center of the electrical wire while also reducing the dimension from the target to the electrical wire. The band clip includes a dish portion, a shaft portion, a locking portion, a band portion, and a band locking portion. The band portion includes a hinge portion, one end of which is connected to the dish portion, and a band main body portion formed with a narrow belt shape so as to extend from the other end of the hinge portion. The band main body portion is formed so as to
(Continued)

extend in a direction orthogonal to the extending direction of the shaft portion, and the hinge portion includes a curved portion.

3 Claims, 6 Drawing Sheets

(51) Int. Cl.
*H02G 3/22* (2006.01)
*F16B 2/08* (2006.01)
*F16B 19/00* (2006.01)
*F16L 3/137* (2006.01)

(58) Field of Classification Search
USPC .............................................. 248/68.1, 74.3
See application file for complete search history.

(56) References Cited

U.S. PATENT DOCUMENTS

| | | | |
|---|---|---|---|
| 5,277,387 A * | 1/1994 | Lewis | F16L 3/1041 24/482 |
| 6,076,781 A * | 6/2000 | Kraus | F16L 3/24 248/231.91 |
| 6,203,240 B1 | 3/2001 | Hironaka | |
| 7,503,528 B2 * | 3/2009 | Adams | F16B 5/0685 24/297 |
| 7,988,105 B2 * | 8/2011 | Kamiya | F16B 21/088 248/71 |
| 2006/0016938 A1 * | 1/2006 | Wakabayashi | B60R 16/0215 248/71 |
| 2007/0284486 A1 * | 12/2007 | Smutny | H02G 3/30 248/74.3 |
| 2012/0112017 A1 * | 5/2012 | Siragusa | B60R 16/0215 248/74.3 |
| 2012/0217355 A1 * | 8/2012 | Geiger | F16L 3/2332 248/74.2 |
| 2015/0102183 A1 | 4/2015 | Yamaguchi | |

FOREIGN PATENT DOCUMENTS

| | | |
|---|---|---|
| JP | 2013153600 A | 8/2013 |
| JP | 2015077013 A | 4/2015 |
| JP | 2016067082 A | 4/2016 |

OTHER PUBLICATIONS

English Translation of International Search Report for Application No. PCT/JP2015/077151 dated Dec. 22, 2015, 2 pages.
International Preliminary Report for Application No. PCT/JP2015/077151 dated Sep. 9, 2015, 8 pages.

* cited by examiner

BAND CLIP

CROSS REFERENCE TO RELATED APPLICATIONS

This application claims the priority of Japanese patent application JP2014-204652 filed on Oct. 3, 2014, the entire contents of which are incorporated herein.

TECHNICAL FIELD

This invention relates to a band clip for fixing electrical wires or the like to a vehicle body.

BACKGROUND ART

A band clip (also called a band clamp) for fixing electrical wires or the like to a vehicle is disclosed in Patent Document 1, for example.

The band clip described in Patent Document 1 (JP2002-174210A) includes a dish-shaped stabilizer (dish portion), and slits cut out from an open portion of the stabilizer increase the amount of flexure while also ensuring elastic reaction force, thus suppressing looseness of the clip.

SUMMARY OF INVENTION

Incidentally, when a belt (band) and a buckle (band fixing portion) are provided on the bottom of a stabilizer, as with the band clip described in Patent Document 1, there is a risk of an increase in the dimension from the attachment target, such as a panel, to electrical wires.

Also, depending on the clip, there are cases where the shaft portion of the clip that extends from the dish portion is not located at the widthwise center of electrical wires when the band has been wrapped around the electrical wires. In this case, there is a risk of error in the routing path of the electrical wires in the vehicle.

In view of this, an object of the present design is to provide a technique that, when an electrical wire has been attached to an attachment target by a clip, makes it possible to position a shaft portion of the clip toward the widthwise center of the electrical wire while also reducing the dimension from the attachment target to the electrical wire.

In order to solve the aforementioned problem, a band clip according to a first aspect includes: a dish portion that is formed with a dish shape and includes a bottom portion and a body portion that extends circumferentially outward from an outer circumferential edge portion of the bottom portion; a shaft portion that extends from the bottom portion of the dish portion toward a side on which the body portion is provided; a locking portion that extends from a tip of the shaft portion toward a dish portion side; a band portion that can be wrapped around an electrical wire and includes a hinge portion, one end of which is connected to a base end of the shaft portion, and a band main body portion formed with a narrow belt shape so as to extend from another end of the hinge portion; and a band locking portion that is provided inside the shaft portion and can lock a tip side of the band portion in a state where the band portion has been wrapped around an electrical wire, wherein the band main body portion is formed so as to extend in a direction orthogonal to an extending direction of the shaft portion, and the hinge portion includes a curved portion that is formed with a curved shape so as to extend from the direction orthogonal to the extending direction of the shaft portion toward a side opposite to a side toward which the shaft portion extends.

A band clip according to a second aspect is the band clip according to the first aspect, wherein the curved portion is formed such that a cross-sectional area thereof is smallest in a lengthwise intermediate portion thereof.

A band clip according to a third aspect is the band clip according to the first or second aspect, wherein a receding portion is formed in the body portion such that an outer edge of the body portion recedes toward the bottom portion, the receding portion having a width greater than or equal to a width of the hinge portion, and the hinge portion extends outward through a portion in which the receding portion is formed in a view from the extending direction of the shaft portion.

According to the band clip of the first to third aspects, the band locking portion is provided in the shaft portion, thus making it possible to suppress the dimension from the attachment target to the electrical wire when the electrical wire is attached to the attachment target using the band clip. Also, the band main body portion is formed so as to extend in the direction orthogonal to the extending direction of the shaft portion, and the hinge portion includes the curved portion that is formed with a curved shape so as to extend from the direction orthogonal to the extending direction of the shaft portion toward the side opposite to the side toward which the shaft portion extends, and therefore by bending the entirety of the curved portion a large amount, the base portion of the band main body portion can be positioned toward the center of the shaft portion. Accordingly, the shaft portion of the band clip can be positioned toward the widthwise center of the electrical wire.

In particular, according to the band clip of the second aspect, the curved portion is formed such that the cross-sectional area thereof is smallest in the lengthwise intermediate portion thereof, thus making it likely for the entirety of the curved portion to bend, while bending a larger amount in the portion with the smallest cross-sectional area. Accordingly, the shaft portion of the band clip is more easily positioned toward the widthwise center of the electrical wire.

In particular, according to the clip of the third aspect, the receding portion is formed in the body portion such that the outer edge of the body portion recedes toward the bottom portion, the receding portion having a width greater than or equal to the width of the hinge portion, and the hinge portion extends outward through the portion in which the receding portion is formed in a view from the extending direction of the shaft portion, and therefore it is possible to suppress interference between the hinge portion and the dish portion, even in the case where the hinge portion bends a large amount.

DESCRIPTION OF EMBODIMENTS

Figure 1:
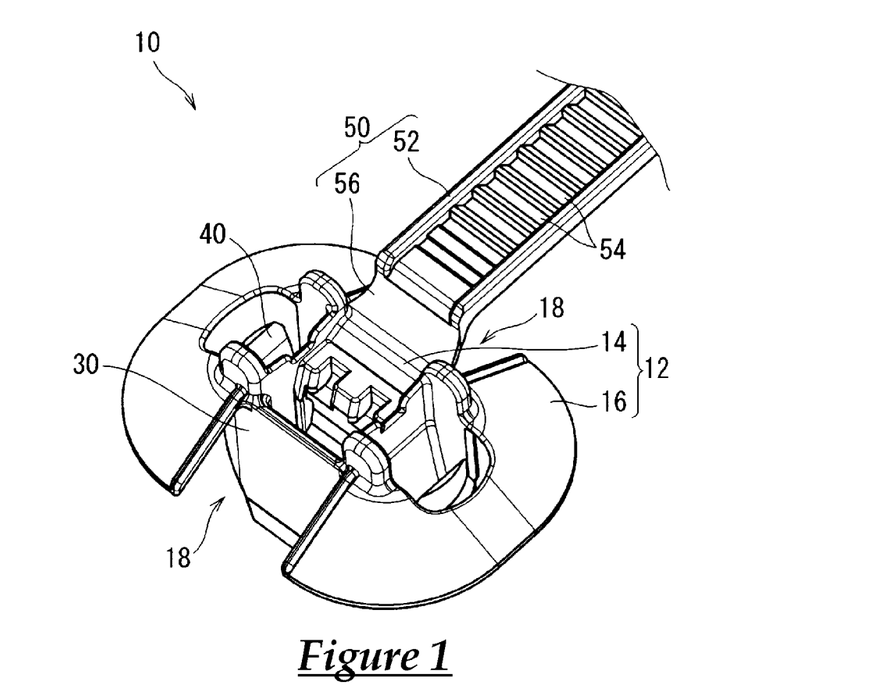
FIG. 1 is a perspective view of a band clip according to an embodiment.
Figure 2:
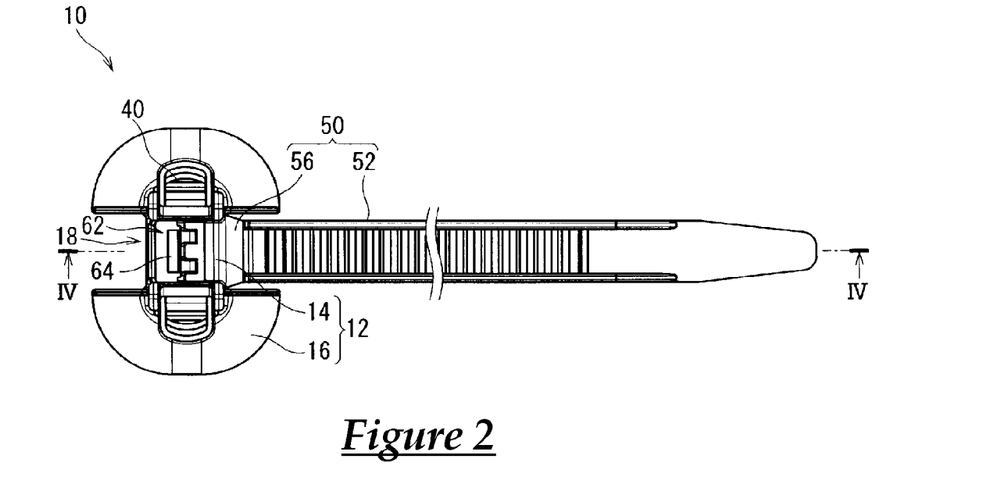
FIG. 2 is a plan view of the band clip according to the embodiment.
Figure 3:
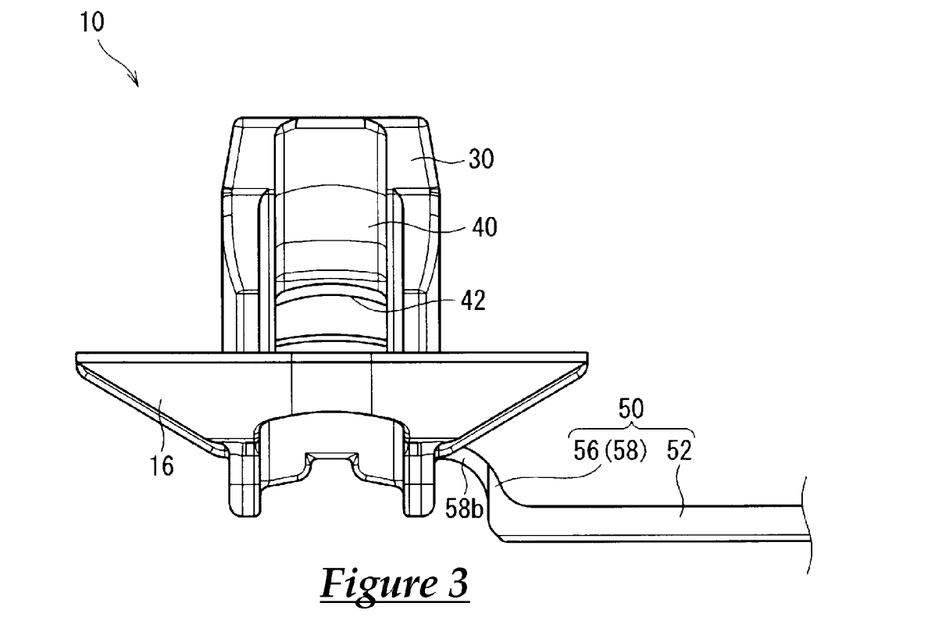
FIG. 3 is a front view of the band clip according to the embodiment.
Figure 4:
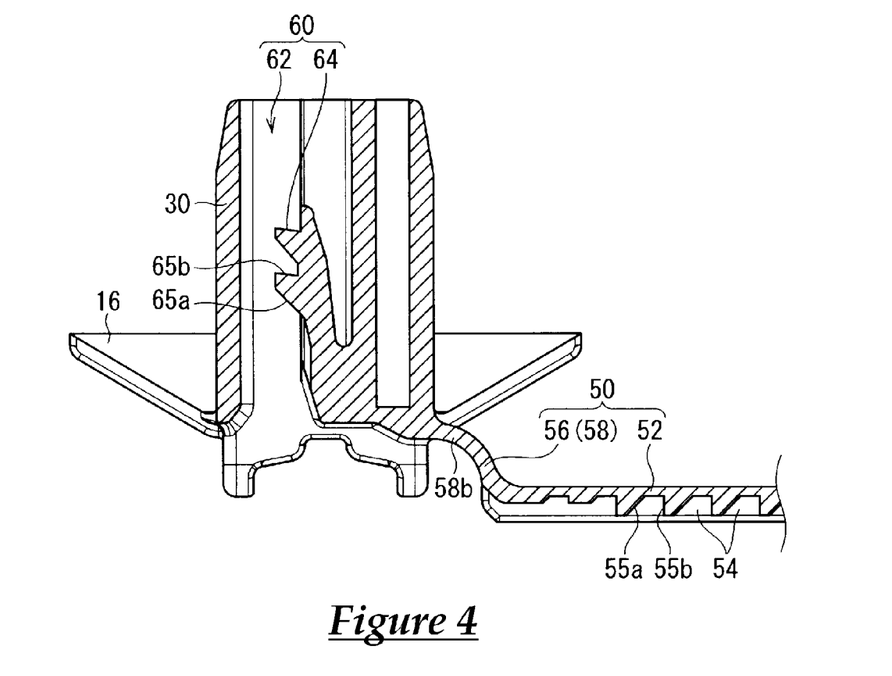
FIG. 4 is a cross-sectional view taken along line IV-IV in FIG. 2.

Hereinafter, a band clip 10 according to an embodiment will be described. FIG. 1 is a perspective view of the band clip 10 according to the embodiment. FIG. 2 is a plan view of the band clip 10 according to the embodiment. FIG. 3 is a front view of the band clip 10 according to the embodiment. FIG. 4 is a cross-sectional view taken along line IV-IV in FIG. 2.

The band clip 10 according to the embodiment is a member by which another member routed in a vehicle, such as an electrical wire, is fixed to the vehicle. The band clip 10 according to the embodiment includes a dish portion 12, a shaft portion 30, locking portions 40, a band portion 50, and a band locking portion 60. The band clip 10 is formed so as to be able to be inserted into an attachment hole formed in an attachment target, such as a vehicle body panel, and so as to be able to be locked after insertion.

The dish portion 12 includes a bottom portion 14 and a body portion 16, and is formed in a dish shape. The dish portion 12 exhibits the function of a disc spring when locking the band clip 10 to the attachment hole.

The bottom portion 14 is formed in a shape of extending along an inner circumferential edge portion of the attachment hole in a plan view. Here, the bottom portion 14 will be described as being formed with an elliptical shape such as a rectangle with rounded corners. Of course, the bottom portion 14 can also have another shape such as a circular shape, an oval shape, or a square shape.

The body portion 16 is formed so as to extend while increasing in diameter circumferentially outward from the outer circumferential edge portion of the bottom portion 14. The outer edge of the body portion 16 is set so as to be located outward of the attachment hole.

When locking the band clip 10 to the attachment hole, if the gap between the body portion 16 and the later-described locking portions 40 along the extending direction of the shaft portion 30 is smaller than the thickness dimension of the attachment target, the body portion 16 bends so as to increase in diameter, thus making it possible to absorb the difference. Accordingly, attachment targets with different thicknesses can be handled with the one type of band clip 10. Also, if the gap between the body portion 16 and the locking portions 40 along the extending direction of the shaft portion 30 is the same as or smaller than the thickness dimension of the attachment target, the body portion 16 comes into close contact with the attachment target, and the body portion 16 bends so as to increase in diameter during vehicle vibration or the like, thus making it possible to suppress looseness.

Also, receding portions 18 are formed in the body portion 16. The receding portions 18 will be described in detail later.

The shaft portion 30 is formed so as to extend from the bottom portion 14 of the dish portion 12 toward the side on which the body portion 16 is provided. Here, the shaft portion 30 is provided such that the extending direction thereof is orthogonal to the main surface of the bottom portion 14.

Two locking portions 40 are formed so as to extend from the tip of the shaft portion 30 toward the dish portion 12 side. The locking portions 40 are portions that are caught on the inner circumferential edge portion of the attachment hole after insertion into the attachment hole. The band clip 10 is locked to the attachment hole by the locking portions 40 becoming caught on the inner circumferential edge portion of the attachment hole.

More specifically, the pair of locking portions 40 are formed so as to extend from portions of the shaft portion 30 that face the short-side portions of the bottom portion 14. In other words, the direction that connects the pair of locking portions 40 is set so as to be parallel with the direction that connects the pair of short sides of the bottom portion 14. Accordingly, it is possible to prevent the locking portions 40 from overlapping the later-described receding portions 18 formed in the body portion 16.

Also, the pair of locking portions 40 are formed such that the width thereof is set larger than the width of the attachment hole, and so as to be capable of undergoing elastic deformation such that the width thereof becomes smaller than the width of the attachment hole. By the locking portions 40 undergoing elastic deformation such that the width of the locking portions 40 becomes smaller than the width of the attachment hole, the locking portions 40 can be inserted into and pass through the attachment hole. Then, by the locking portions 40 undergoing elastic restoration after passing through the attachment hole, the width thereof becomes larger than the width of the attachment hole, the tip regions of the locking portions 40 become caught on the inner circumferential edge portion of the attachment hole, and the band clip 10 becomes locked to the attachment hole.

Here, step portions 42 are provided at the tips of the locking portions 40, and these step portions 42 are set such that the inner circumferential edge portion of the attachment hole becomes caught thereon. Here, the step portions 42 are set so as to have two steps, but this is not essential. In the case where the step portions 42 are provided, the number of steps may be one, or three or more. The greater the number of steps in the step portions 42 is, the greater the range of thicknesses that can be handled with the one type of band clip 10.

The band portion 50 includes a hinge portion 56 and a band main body portion 52. The band portion 50 is formed so as to be able to be wrapped around an electrical wire 80. Here, the band portion 50 is formed so as to extend laterally from a long-side portion of the dish portion 12.

The hinge portion 56 is formed such that one end thereof is connected to the dish portion 12. The hinge portion 56 is formed so as to be bent more easily than the band main body portion 52. Here, by forming the hinge portion 56 with a smaller cross-sectional area (smaller thickness) than the band main body portion 52, it is caused to be bent more easily than the band main body portion 52. Also, the hinge portion 56 includes a curved portion 58. Here, the hinge portion 56 is provided such that the surface thereof that faces the electrical wire 80 side is smoothly continuous with the surface of the bottom portion 14 that faces the electrical wire 80 side.

The curved portion 58 is formed with a curved shape so as to extend from a direction orthogonal to the extending direction of the shaft portion 30, toward the side opposite to the side toward which the shaft portion 30 extends. In other words, the curved portion 58 is formed with a curved shape so as to bulge outward (toward the side opposite to the electrical wire side). More specifically, here, the hinge portion 56 is constituted by only the curved portion 58, and the curved portion 58 is formed with a ¼ circular arch shape.

Also, the curved portion 58 is formed such that the cross-sectional area thereof is the smallest in the lengthwise intermediate portion (here, the lengthwise central portion) thereof. Hereinafter, the portion where the cross-sectional area is the smallest is called the smallest portion 58b. At this time, here, the curved portion 58 is set such that the cross-sectional area thereof smoothly decreases toward the smallest portion 58b along the lengthwise direction.

Note that here, the cross-sectional area of the hinge portion 56 and the curved portion 58 refers to the area of a cross-section taken along the direction orthogonal to the outer surface thereof (the direction orthogonal to the tangential direction of the outer surface). Also, here, the curved portion 58 (hinge portion 56) is formed so as to gradually widen toward the base end portion. For this reason, the width of the smallest portion 58b is larger than that of the portion of the curved portion 58 (hinge portion 56) connected to the band main body portion 52, but the cross-sectional area is made the smallest by reducing the thickness by a commensurate amount.

Of course, it is not essential for the hinge portion 56 to be constituted by only the curved portion 58. The hinge portion may include a portion other than the curved portion 58, such as a portion formed with a straight line shape.

Also, it is not essential for the curved portion 58 to be formed with a ¼ circular arch shape. The curved portion may be formed with a circular arch shape smaller than ¼, such as a ⅙ circular arch shape, or may be formed with a circular arch shape larger than ¼, such as a ⅓ circular arch shape.

Also, it is not essential for the curved portion 58 to be formed such that the cross-sectional area thereof is the smallest in the lengthwise intermediate portion thereof. For example, the curved portion may be formed such that the same cross-sectional area continues along the lengthwise direction.

The band main body portion 52 is formed with a narrow belt shape so as to extend from the other end of the hinge portion 56. The band main body portion 52 is formed so as to extend outward in a direction orthogonal to the extending direction of the shaft portion 30.

The band locking portion 60 is provided on end side of the band portion 50. Also, the band locking portion 60 is formed so as to be able to lock the other end side of the band portion 50 when the band portion 50 has been wrapped around an electrical wire 80. Here, the band locking portion 60 is provided in the shaft portion 30.

The band portion 50 and the band locking portion 60 are locked as described below.

Specifically, multiple locking recession portions 54 are formed in the main surface of the band main body portion 52 on one side (here, the main surface that faces the electrical wire 80 side when the band main body portion 52 has been wrapped around an electrical wire 80) so as to be side-by-side along the lengthwise direction of the band main body portion 52. Also, the band locking portion 60 is provided with a through-hole 62 that passes through the shaft portion 30 and the bottom portion 14 along the extending direction of the shaft portion 30 that extends from the bottom portion 14, and is provided with a protrusion 64 that extends from the inner surface of the through-hole 62 and is capable of selectively locking the locking recession portions 54 of the band main body portion 52. Here, the protrusion 64 is formed so as to fit into two locking recession portions 54 that are adjacent among the locking recession portions 54 of the band main body portion 52. Also, the inner circumferential surfaces of the locking recession portions 54 and the outer circumferential surface of the protrusion 64 are formed so as to respectively have inclined surfaces 55a and 65a that are inclined relative to the direction in which the band main body portion 52 moves through the through-hole 62, and also perpendicular surfaces 55b and 65b that are approximately orthogonal to the moving direction.

When the band main body portion 52 is wrapped around electrical wires 80 and then the tip thereof is inserted into the through-hole 62, the protrusion 64 successively fits into the locking recession portions 54 of the band main body portion 52 beginning from the locking recession portion 54 located on the tip side. At this time, when the band main body portion 52 attempts to move in the direction of insertion through the through-hole 62, the inclined surfaces 55a of the locking recession portions 54 move over the inclined surfaces 65a of the protrusion 64, and the protrusion 64 undergoes elastic deformation in the direction of coming out of the locking recession portions 54. Accordingly, the band main body portion 52 can move in the direction of insertion through the through-hole 62. When the band main body portion 52 attempts to move in the direction opposite to the direction of insertion through the through-hole 62, that is to say the direction of pulling the band main body portion 52 out of the through-hole 62, the perpendicular surfaces 65b of the protrusion 64 engage with the perpendicular surfaces 55b of the locking recession portions 54, and the band main body portion 52 cannot move. Then, when the band main body portion 52 is tightly wrapped around the electrical wires 80 and cannot be inserted into the through-hole 62 any further, the band main body portion 52 cannot move toward either side in the insertion direction, and the band portion 50 is in a state of being locked to the band locking portion 60.

Also, the band main body portion 52 is formed such that the width dimension and the thickness dimension in the vicinity of the tip decrease toward the tip. Also, the inner circumferential edge portion of the through-hole 62 in the vicinity of the opening on the side that receives the band main body portion 52 is formed with a tapered shape. Accordingly, the band main body portion 52 enters the through-hole 62 more easily.

The receding portions 18 are formed in the body portion 16 such that the outer edge of the body portion 16 recedes toward the bottom portion 14, and have a width greater than or equal to the width of the hinge portion 56. Also, the hinge portion 56 extends outward through a portion in which a receding portion 18 is formed in a view from the extending direction of the shaft portion 30 (in the plan view in FIG. 2).

Specifically, here, the receding portions 18 are formed such that the entirety of the portions of the body portion 16 that extend from the long-side portions of the bottom portion 14 having a receding shape. In other words, the receding portions 18 are formed such that the outer edges of the body portion 16 that are located to the sides of the long-side portions of the bottom portion 14 recede until they reach the bottom portion 14. For this reason, the body portion 16 is formed such that an intermediate portion thereof is isolated by the receding portions 18, thus being shaped so as to be divided into two portions. From another viewpoint, the body portion 16 is formed so as to extend from the short-end portions and rounded corner portions of the bottom portion 14, which is formed in the shape of a rectangle having rounded corners.

Note that here, the receding portions 18 are formed so as to be symmetrical with respect to the bottom portion 14 in a plan view (bilaterally symmetrical in the plan view in FIG. 2), but this is not essential. For example, it is possible for a receding portion 18 to be formed on, out of the portions located to the right and left of the bottom portion 14 in the plan view in FIG. 2, only the portion on the side on which the band portion 50 extends. Also, for example, it is possible for the receding portions 18 to be formed so as to be located to the right and left of the bottom portion 14 in the plan view in FIG. 2, but be formed with different shapes on the left and right sides. Of course, it is preferable that the receding portions 18 are formed so as to be symmetrical with respect to the bottom portion 14 in a plan view.

Also, the hinge portion 56 extends outward through the portion in which a receding portion 18 is formed in the plan view in FIG. 2, and thus the body portion 16 and the hinge portion 56 are set so as to not overlap each other in a plan view. Furthermore, here, the band main body portion 52 is also set so as to not overlap the body portion 16 in a plan view.

Due to the receding portions 18 being formed in the body portion 16, and due to the hinge portion 56 being set so as to not overlap the body portion 16 in a plan view, it is possible to suppress interference between the hinge portion 56 and the dish portion 12, even in the case where the hinge portion 56 bends a large amount.

Furthermore, due to the receding portions 18 being formed in the body portion 16, when the gap between the body portion 16 and the locking portion 40 along the extending direction of the shaft portion 30 is smaller than the thickness dimension of the attachment target, the body portion 16 more readily bends so as to increase in diameter, and the amount of force needed for such insertion decreases.

Furthermore, due to the receding portions 18 being formed such that there are no portions of overlap between the band portion 50 and the body portion 16 in a plan view, the band portion 50 can be manufactured by vertical mold removal. More specifically, by reducing the number of portions that overlap each other in a view from one direction (here, in a plan view) and whose intermediate portion has a recessed shaped (a so-called undercut shape), there is an increase in the number of portions that can be manufactured by vertical mold removal when manufacturing the band clip 10. Accordingly, the manufacturing of the band clip 10 becomes easier, and it is possible to suppress costs related to manufacturing the band clip 10.

Figure 5:
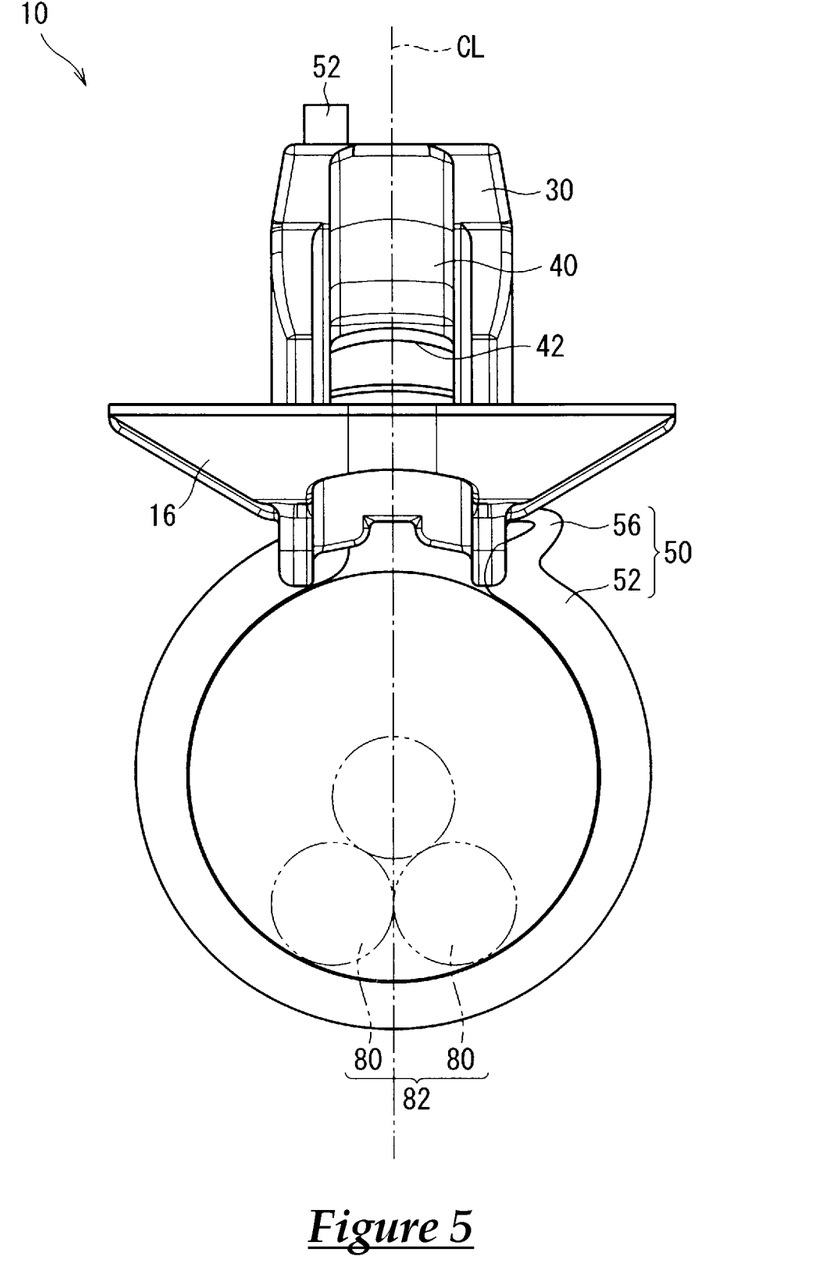
FIG. 5 is a front view of a state in which the band clip has been wrapped around electrical wires.

Next, the external shape of the band portion 50 when the band portion 50 of the band clip 10 has been wrapped around electrical wires 80 will be described. FIG. 5 is a front view of a state in which the band clip 10 has been wrapped around electrical wires 80. Note that a central line CL that passes through the center of the shaft portion 30 is drawn in FIG. 5.

The following describes the electrical wires 80 to which the band clip 10 is attached.

The electrical wires 80 need only include at least one wire. The electrical wires 80 each have a configuration in which a sheath portion is formed by, for example, the extrusion coating of resin around a core wire. The following describes an example of an electrical wire bundle 82 in which multiple electrical wires 80 are bundled. Note that an optical fiber or the like may be routed along the electrical wires 80 in the electrical wire bundle 82. The electrical wires 80 are used for electrically connecting together various types of electrical devices installed in a vehicle or the like, in a state of being installed at an installation target location in the vehicle or the like. Note that an outline of the electrical wire bundle 82 is drawn in FIG. 5.

When the band portion 50 is wrapped around the electrical wires 80, the curved portion 58 of the hinge portion 56 bends a large amount, and the base portion of the band main body portion 52 is positioned toward the center of the shaft portion 30. Then, in this state, the portion of the band main body portion 52 on the tip side of the base portion is wrapped around the electrical wires 80 along the outer circumference thereof. Accordingly, the shaft portion 30 of the band clip 10 can be positioned toward the widthwise center of the electrical wires 80.

In particular, if the diameter of the electrical wires 80 (diameter of the electrical wire bundle 82) that the band portion 50 is wrapped around is small, the positions of the electrical wires 80 are readily influenced by the external shape of the band portion 50, and therefore the shaft portion 30 of the band clip 10 is readily shifted from the widthwise center of the electrical wires 80. However, in this case as well, when the band portion 50 is locked to the band locking portion 60 as-is without being wrapped around electrical wires, as shown in later-described analysis results, the base portion of the band main body portion 52 moves toward the center of the shaft portion 30, and thus the widthwise center of the electrical wires 80 (electrical wire bundle 82) more readily becomes positioned toward the center of the shaft portion 30.

The inventors performed analysis regarding the effect of being able to position the shaft portion 30 of the band clip 10 toward the widthwise center of the electrical wires 80 by providing the hinge portion 56 with the curved portion 58. This will be described in detail below.

Figure 6:
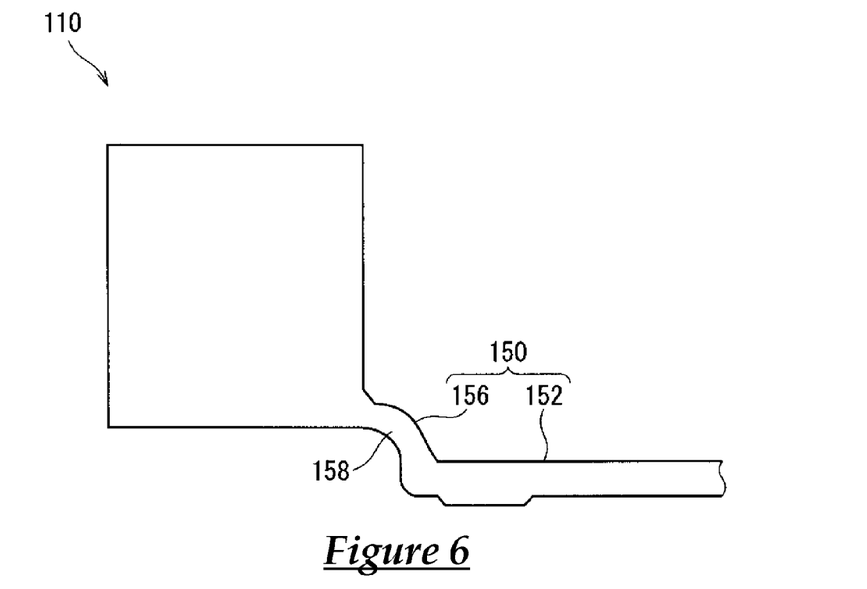
FIG. 6 is a diagram showing the external shape of a band clip used for analysis.
Figure 7:
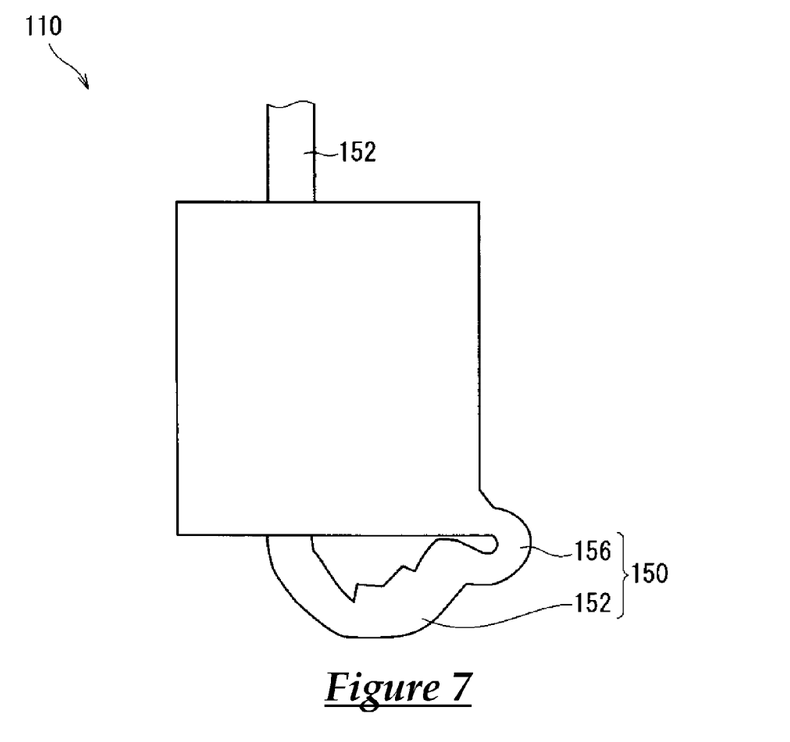
FIG. 7 is an analysis diagram showing a state in which a band portion of the band clip in FIG. 6 has been fixed to a band fixing portion.
Figure 8:
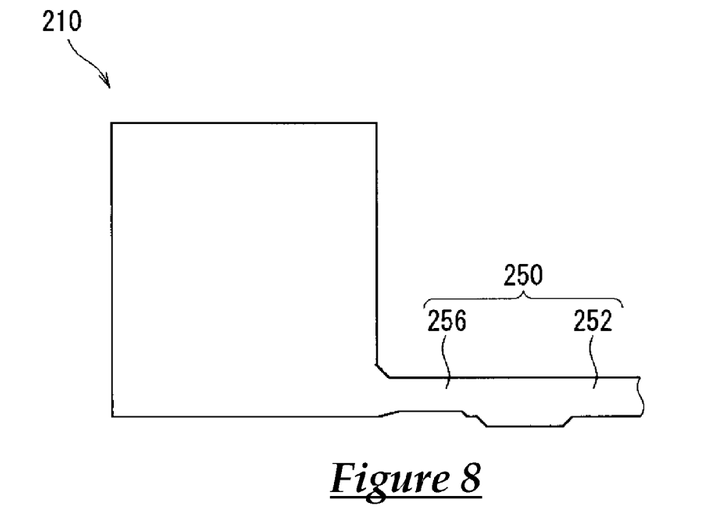
FIG. 8 is a diagram showing the external shape of another band clip used for analysis.
Figure 9:
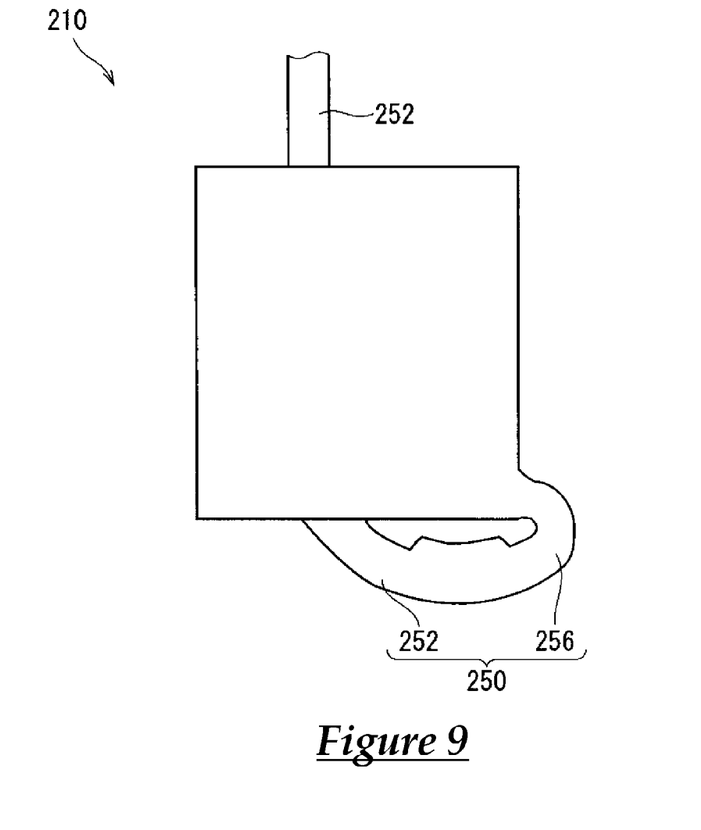
FIG. 9 is an analysis diagram showing a state in which the band portion of the band clip in FIG. 8 has been fixed to the band fixing portion.
Figure 10:
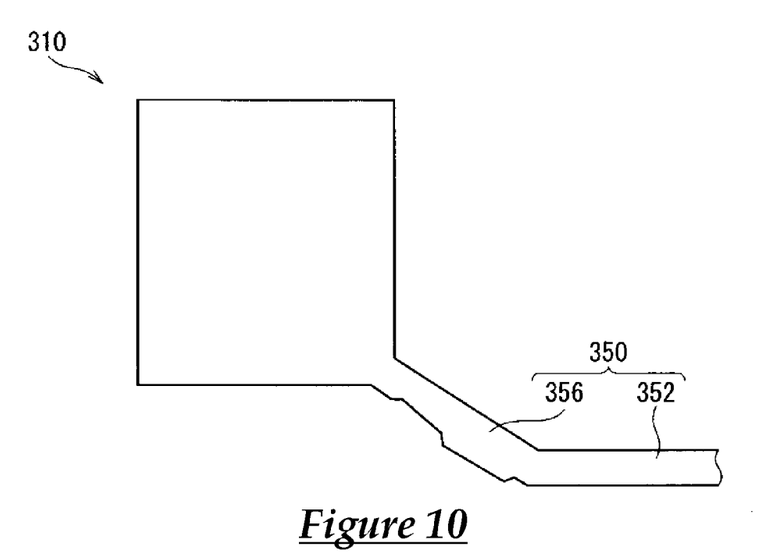
FIG. 10 is a diagram showing the external shape of yet another band clip used for analysis.
Figure 11:
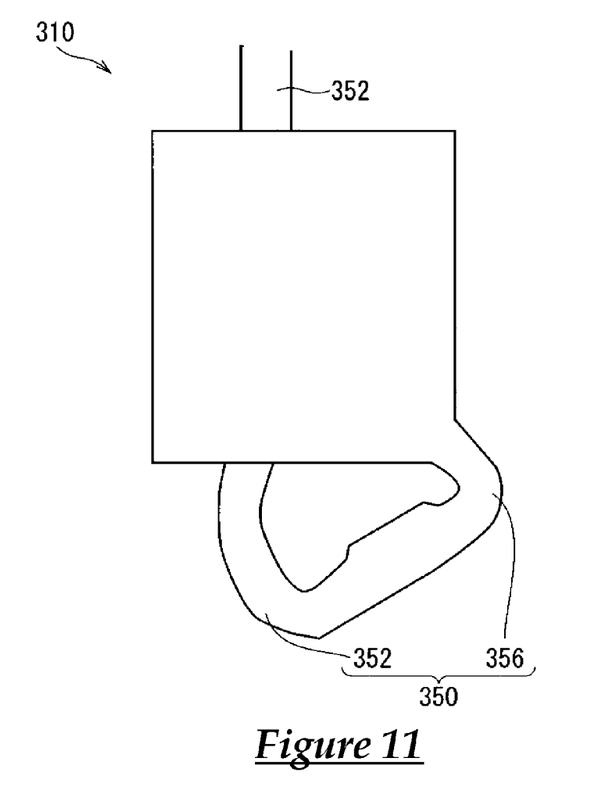
FIG. 11 is an analysis diagram showing a state in which the band portion of the band clip in FIG. 10 has been fixed to the band fixing portion.

The inventors performed analysis regarding the external shapes of three types of band portions 150, 250, and 350, which have different shapes, when they have been locked to a band locking portion. The following describes the conditions of the analysis (the shapes of the band portions 150, 250, and 350) and the results thereof with reference to FIGS. 6 to 11. Note that FIGS. 6, 8, and 10 are figures respectively showing the pre-locking external shapes of three types of band clips 110, 210, and 310 used in the analysis. Also, FIGS. 7, 9, and 11 are analysis diagrams respectively showing states in which the band portions 150, 250, and 350 of the band clips 110, 210, and 310 in FIGS. 6, 8, and 10 have been locked to the band locking portions. Note that in order to facilitate the description, in FIGS. 6 to 11, the portions other than the band portions 150, 250, and 350 are formed with a box shape, and the band locking portions are provided inside these portions formed with a box shape.

Similarly to the band clip 10 of the embodiment, the band clip 110 shown in FIG. 6 is formed such that a band main body portion 152 extends in a straight line shape via a hinge portion 156 that has a curved portion 158.

When the band portion 150 of the band clip 110 is locked to the band locking portion, as shown in FIG. 7, the band portion 150 bends a large amount circumferentially inward in the hinge portion 156, and the base portion of the band main body portion 152 moves toward the center of the box-shaped portion. The band main body portion 152 bends circumferentially outward in the portion joined to the hinge portion 156, then gently bends circumferentially inward in the portion from the base portion to the tip, and is housed in the band locking portion.

The band clip 210 shown in FIG. 8 is formed such that a hinge portion 256 also extends in a straight line shape in the same direction as the band main body portion 252.

When the band portion 250 of the band clip 210 is locked to the band locking portion, as shown in FIG. 9, it bends a large amount circumferentially inward in the hinge portion 256, then the portion of the hinge portion 256 forward of the bend and the band main body portion 252 gently bend circumferentially inward likewise to the largely bent portion of the hinge portion 256, and the band main body portion 252 is housed in the band locking portion.

In the band clip 310 shown in FIG. 10, a hinge portion 356 is formed with a straight line shape, but the extending direction thereof is set so as to form an angle with the band main body portion 352, and in FIG. 10, the hinge portion 356 is set so as to extend diagonally downward outward from the dish portion (portion formed with a box shape).

When the band portion 350 of the band clip 310 is locked to the band locking portion, as shown in FIG. 11, it bends a large amount circumferentially inward in the hinge portion 356, then the portion of the hinge portion 356 forward of the bend extends in an approximately straight line shape, and thereafter the joining portion of the hinge portion 356 and the band main body portion 352 bends a large amount circumferentially inward again. The portion of the band main body portion 352 forward of the bend then gently bends circumferentially inward, and is housed in the band locking portion.

Based on the above analysis results, it is understood that when the hinge portion is provided in a straight line shape, the base end portion side of the hinge portion bends a large amount, and the portion forward thereof does not bend very much.

In contrast, when the hinge portion is provided with a curved portion, the hinge portion bends a large amount overall in the portion with the curved portion, thus making it possible to position the base portion of the band main body portion toward the center of the shaft portion. Also, the band main body portion bends in a uniform manner from the base portion that is positioned toward the center of the shaft portion, and thus readily takes a shape that conforms to the outer circumference of the electrical wires. Accordingly, the widthwise center of the electrical wires (electrical wire bundle) more easily becomes positioned toward the center of the shaft portion.

Note that in the above analysis, the band portions 150, 250, and 350 were set in a state of being locked to the band locking portions as-is, and the band portions 150, 250, and 350 were not set in a state of being wrapped around electrical wires. However, even in states where the band portions 150, 250, and 350 have been wrapped around electrical wires, the external shapes thereof are determined according to the states where the band portions 150, 250, and 350 have been locked to the band locking portions as-is, and therefore the external shapes of the band portions 150, 250, and 350 when wrapped around electrical wires and locked to the band locking portions are thought to be similar to the above-described shapes.

According to the band clip 10 of the embodiment, the band locking portion 60 is provided in the shaft portion 30, and therefore it is possible to suppress the dimension from the attachment target to the electrical wires 80 when the electrical wires 80 are attached to the attachment target by the band clip 10. Also, the band main body portion 52 is formed so as to extend in the direction orthogonal to the extending direction of the shaft portion 30, and the hinge portion 56 includes the curved portion 58 that is formed with a curved shape so as to extend from the direction orthogonal to the extending direction of the shaft portion 30 toward the side opposite to the side toward which the shaft portion 30 extends, and therefore by bending the entirety of the curved portion 58 a large amount, the base portion of the band main body portion 52 can be positioned toward the center of the shaft portion 30. Accordingly, the shaft portion 30 of the band clip 10 can be positioned toward the widthwise center of the electrical wires 80.

Also, the curved portion 58 is formed such that the cross-sectional area thereof is the smallest in the lengthwise intermediate portion thereof, thus making it likely for the entirety of the curved portion 58 to bend, while bending a larger amount in the portion with the smallest cross-sectional area. Accordingly, the shaft portion 30 of the band clip 10 can be more easily positioned toward the widthwise center of the electrical wires 80.

Also, the receding portions 18, which have a width greater than or equal to the hinge portion 56, are formed in the body portion 16 of the dish portion 12 so as to extend from the outer circumferential edge portion toward the bottom portion 14, and the hinge portion 56 extends outward through a portion in which a receding portion 18 is formed in a view from the extending direction of the shaft portion 30, and therefore it is possible to suppress interference between the hinge portion 56 and the dish portion 12, even in the case where the hinge portion 56 bends a large amount.

Although this invention has been described in detail above, the above description is illustrative in all respects, and this invention is not limited to the above description. It will be understood that numerous variations not illustrated here can be envisioned without departing from the range of this invention.

REFERENCE SIGNS LIST

10 Band clip
12 Dish portion
14 Bottom portion
16 Body portion
18 Receding portion
30 Shaft portion
40 Locking portion
50 Band portion
52 Band main body portion
56 Hinge portion
58 Curved portion
60 Band locking portion

The invention claimed is:
1. A band clip comprising:
 a dish portion that is formed with a dish shape and includes a bottom portion and a body portion, the body portion extends circumferentially outward from an outer circumferential edge portion of the bottom portion and includes a receding portion, the receding portion is formed in the body portion such that an outer edge of the body portion recedes inward toward the bottom portion;
 a shaft portion that extends from the bottom portion of the dish portion toward a side on which the body portion is provided;
 a locking portion that extends from a tip of the shaft portion toward a dish portion side;
 a band portion that can be wrapped around an electrical wire and includes a hinge portion and a main body portion, the hinge portion includes one end that is connected to a base end of the shaft portion through the receding portion of the body portion, the hinge portion includes another end from which the main body portion extends with a narrow belt shape, the main body portion includes a locking recession portion; and a band locking portion that is formed inside the shaft portion and can lock a tip side of the band portion in a state where the band portion has been wrapped around an electrical wire, the band locking portion includes a through hole that passes through the shaft portion and a protrusion that extends from an inner surface of the through hole and can engage the locking recession portion of the main body portion;

wherein the band main body portion is formed so as to extend in a direction orthogonal to an extending direction of the shaft portion when the band portion is not inserted into the band locking portion, and the band main body portion is formed so as to extend up into the through hole in the shaft portion when the band portion is inserted into the band locking portion.

2. The band clip according to claim 1, wherein the hinge portion further includes a curved portion that is formed with a curved shape, and the curved portion is formed such that a cross-sectional area thereof is smallest in a lengthwise intermediate portion thereof.

3. The band clip according to claim 1, wherein the receding portion has a width greater than or equal to a width of the hinge portion, and the hinge portion extends outward through a portion in which the receding portion is formed in a view from the extending direction of the shaft portion.

* * * * *